United States Patent [19]

Skau

[11] 4,017,396
[45] Apr. 12, 1977

[54] CENTRIFUGAL FILTRATION TUBE FOR REMOVAL OF THE MOTHER LIQUOR FROM THE CRYSTALS IN THE PURIFICATION OF A CHEMICAL COMPOUND BY RECRYSTALLIZATION

[75] Inventor: Evald L. Skau, New Orleans, La.

[73] Assignee: The United States of America as represented by the Secretary of Agriculture, Washington, D.C.

[22] Filed: Sept. 19, 1975

[21] Appl. No.: 615,039

Related U.S. Application Data

[63] Continuation-in-part of Ser. No. 445,742, Feb. 25, 1974, abandoned.

[52] U.S. Cl. .............................. 210/232; 210/476; 210/479
[51] Int. Cl.² .................................. B01D ; C02B ; C02C
[58] Field of Search .......... 210/232, 238, 244, 248, 210/256, 291, 335, 337, 464, 473, 476, 443, 444, 451, 452, 453, 456, 470, 474, 477, DIG. 24, 479

[56] References Cited

UNITED STATES PATENTS

| | | | |
|---|---|---|---|
| 2,110,237 | 3/1938 | Parsons | 210/DIG. 24 |
| 2,202,055 | 5/1940 | Juffa | 210/473 |
| 2,334,802 | 11/1943 | Zuckermann | 210/335 |
| 2,775,350 | 12/1956 | Jones | 210/477 |
| 3,300,051 | 1/1967 | Mitchell | 210/DIG. 24 |
| 3,539,300 | 11/1970 | Stone | 210/335 |
| 3,583,627 | 6/1971 | Wilson | 210/DIG. 24 |
| 3,788,483 | 1/1974 | Conway | 210/474 |

Primary Examiner—Bernard Nozick
Assistant Examiner—Frank Sever
Attorney, Agent, or Firm—M. Howard Silverstein; David G. McConnell

[57] ABSTRACT

This invention relates to an apparatus and method for the purification of solid and liquid chemical compounds by recrystallization. Specifically, it comprises in combination a male member fitted into a female receiving segment, a filtering segment and a splash shield.

3 Claims, 6 Drawing Figures

CENTRIFUGAL FILTRATION TUBE FOR REMOVAL OF THE MOTHER LIQUOR FROM THE CRYSTALS IN THE PURIFICATION OF A CHEMICAL COMPOUND BY RECRYSTALLIZATION

This is a continuation-in-part of application Ser. No. 445,742, filed on Feb. 25, 1974, now abandoned.

This invention relates to containers for use in cup-type centrifuges. It provides improved containers for use in operations such as the solvent crystallization of both solid and liquid compounds and the removal of the mother liquor from the crystals by centrifugal force at a selected subzero, ambient or elevated temperature.

In the purification of a chemical compound by recrystallization, the effectiveness of the process depends upon the completeness of the separation of the crystals from the mother liquor. Ordinary filtration is very inefficient. Air channels tend to form even when suction is applied and considerable mother liquor is inevitably retained mechanically by the crystals. Furthermore, the crystals are contaminated by impure crystals which are formed as a result of evaporation of solvent from the already saturated mother liquor. This occurs not only during filtration, but also during the previous cooling or recrystallization periods when a crust or ring of impure crystals tends to form around the top of the solution. This is a particularly important factor when volatile solvents are used or when the filtration is carried out by suction and/or above room temperature. Ordinary filtration has the following added disadvantages: (1) it involves considerable loss of material in the absence of special precautions, (2) there is a considerable chance for contamination of the crystals by dust particles or by other foreign matter, such as minute fragments of fiber left on the crystals when collected from the filter paper, especially if the filter paper used had been frayed by, for example, folding or creasing. It is well known in the art that such contamination by carbonaceous matter results in major inaccuracies in the quantitative carbon and hydrogen analysis of the crystals of organic compounds, (3) in the case of hygroscopic substances or during filtration below room temperature, contamination will result from absorption or condensation of atmospheric moisture. These factors take on added significance when small amounts of material are being dealt with.

The inventor of the instant invention described a glass container, referred to as a "centrifugal filtration tube" (Journal of Physical Chemistry, Vol. 33, pages 851 to 854, June 1929) and a modification thereof (E. L. Skau and W. Bergmann, Journal of Organic Chemistry, Vol. 3, pages 166 to 174, 1938) which overcame many of these difficulties.

General acceptance of the containers described in these references has, however, been prevented because of unsatisfactory performance (resulting from the positioning and design of the perforated porcelain disk or strainer). The initial design gave incomplete recovery of the crystals. The disk rested loosely on a shoulder, i.e., on a constriction in the walls of the container at a point below the ground joint of the receiver. This allows some of the crystals to pass around and under the edges of the disk, i.e., through the spaces between the edges of the disk and the walls of the container and between the surfaces of the disk and the shoulder. A more satisfactory separation of the crystals can be obtained by folding a filter paper well down around the edges of the disk and forcing the disk down to fit snugly to the shoulder and to the walls of the container. However, as might be expected, this severe abrasive treatment results in contamination of the crystals by fragments of filter paper fiber.

In the modified design this passage of crystals into the filtrate was eliminated by grinding the disk into the ground joint; i.e., by grinding the edges of the disk to conform to, and fit snugly into, the standard taper ground joint of the receiver, leaving no space between the edges of the disk and the walls of the container. This improved the filtration efficiency, but after centrifugation the disk was often found to be "frozen" or stuck in the ground joint so that the pure crystals on the disk could not be lifted out by the lift wire without loss of some or all of the crystals or even breakage. This was particularly true when volatile solvents were used and/or especially when centrifugation had been carried out above room temperature. It was sometimes possible to dislodge the disk by pulling the lift wire with increasing force until the force was sufficient to dislodge the disk but this usually resulted either in sudden release and the resultant catapulting and loss of crystals or in breakage.

The "freezing" or sticking of the disk in the ground joint is caused by the formation of an additional crop of crystals during, for example, the cooling of, or loss of solvent by evaporation from, the saturated mother liquor left on the faying surfaces between the disk and the walls of the joint after centrifugation, especially after centrifugation at an elevated temperature. This results, in effect, in "cementing" the faying surfaces together. The formation of cementing crystals is most pronounced when the centrifugation is carried out above room temperature since the mother liquor is then more concentrated and thus more highly supersaturated after cooling to room temperature.

Another disadvantage of these containers is the fact that though the filtration is carried out in a closed container the pure crystals are subjected to considerable exposure to the atmosphere before they can be collected. On disassembly after centrifugation some of the pure crystals remain in the crystallization chamber, some spill out and are caught on a glass plate or watch glass, and some remain on the disk seated in the narrow end of the (female) ground joint of the receiver. These must then be lifted or scooped out by means of the disk manipulated by the lift wire, onto a watch glass or glass plate. It follows from the above, therefore, that these containers cannot be used (1) for the purification of compounds requiring highly volatile solvents and/or centrifugation at elevated temperatures, such for example as are required in the preparation of certain pure polymorphic crystalline forms, because of freezing of the disk or (2) for purification of compounds subject to contamination by exposure to the atmosphere such as hygroscopic compounds and amines.

Other containers that are available for the separation of crystals from mother liquor by centrifugal filtration are unsatisfactory because they require gaskets to make them leak-tight and air-tight. For example, they usually have two joints and the filtrate passes through one of these from the female member to the male member of the joint, contrary to a well-known general principle of theoretical and practical engineering.

The inventor of the instant invention has now designed a new type of glass container. It retains all the advantages while avoiding many of the defects of the prior art. Additionally, it provides numerous improved features.

The improved container consists of (1) a glass crystallization chamber supplied with the male member of a standard taper ground joint; and (2) a filtrate chamber or receiver supplied with the female member of the ground joint by which the two chambers can be joined together to form an air-tight and leak-tight container; and (3) a beveled edge strainer adapted to being removably fixed in a position (a) so as to hold back the crystals and allow the filtrate to flow through into the receiver and (b) so that the crystals will be retained in the crystallization chamber and not spill out when the filtrate chamber is removed on disassembly; and (4) a beveled edge splash shield or splash guard uniquely designed to prevent splashing and creeping of the mother liquor into the crystals. This splash guard is located just below the strainer and athwart the inside diameter of the container.

The splash guard is an essential part of the improved container. It prevents splashes of the filtrate, caused by the almost inevitable jostling of the container during deceleration in the centrifuge or during its removal from the centrifuge and disassembly, from reaching and rewetting the filtered crystals.

The instant invention is particularly suitable for purifications requiring centrifugal filtration at a specified temperature, including elevated temperatures. Since the filter area is very large, substantially equal to the cross-section of the container, the shortest possible time interval is required for the centrifugal separation of the mother liquor from the crystals. Thus, the crystals formed at a given equilibrium temperature can be separated at that temperature, i.e., before any appreciable change in temperature takes place even though centrifugation is carried out at ambient temperature.

Purification by solvent crystallization involves the use of both the crystals and the filtrate for further recrystallization. Therefore, contamination of either the crystals or the mother liquor must be avoided. The instant invention can be used for purifications involving compounds and solvents which at the required temperatures would react with or be sorbed by gasket material such as rubber, plastics, and the like. Reaction with gasket material would result in contamination of the filtrate with the reaction products. Such reaction products and/or solvent and/or solute that have been sorbed by the gasket material could be dissolved and be a source of contamination in a succeeding crystallization involving a different solvent and/or solute.

Since they require no gaskets, the containers of this invention have a number of additional advantages. They can be used for the purification of a wider variety of compounds, solvents, and solutions, even at high temperature, without contamination. They are applicable not only for elevated crystallization and centrifugation temperatures at which gasket materials would begin to soften or melt but also for subzero temperatures at which gasket materials would become brittle, non-resilient, or otherwise non-functional.

When the rate of cooling has been slow, the crystals which are formed are generally fairly large and can usually be filtered out directly by using the strainer without using filter paper or such filtering materials. A flat disk of filter paper may be used if necessary.

The crystallization chamber is the male member. The receiver, into which the mother liquor is centrifuged, is the female member of the container. This is in accord with an important well-known general principle in the art; that is, fluids must be passed through a ground or threaded joint from the male member into the female member of the joint. This is to avoid penetration of the mother liquor into the space between the faying surfaces of the joints, i.e., between the surfaces of the male and female members of the joint. Otherwise, in the case of a centrifugal filtration tube, mother liquor would leak out and be centrifuged off and lost through this space; ie., a gasket would be required to make the container leak-tight and air-tight. Additionally, on disassembly, the mother liquor wetting these surfaces tends to form a deposit or crust of impure crystals. This is primarily due to evaporation of the solvent and constitutes a source of contamination in the recovery of the pure crystals.

The container must be air-tight and leak-tight because the solvents used may be highly volatile and limpid. Variation of temperature up and down cause pressure changes inside the closed containers. If the container is not air-tight, this pressure change would result in either (1) "breathing in" of air, which might lead to contamination of the crystals and/or the filtrate with moisture, and/or carbon dioxide or (2) "breathing out" some of the solvent vapor, which (a) would be a hazard if the solvent were flammable and also (b) would tend to force out any filtrate between the faying surfaces, resulting in the "freezing" of the joint by deposition of solids due to the evaporation of the solvent, thus creating a source of contamination.

In applying the instant invention to the purification of liquid compounds, a certain amount of rather violent splashing of the filtrate can be expected. More specifically since centrifugation is at room temperature, it is important to collect the pure crystals as soon after starting the centrifuge as possible. This is especially true since the crystals melt below room temperature. Here it is imperative also to remove the container from the centrifuge as soon as possible after the switch is turned off. Therefore, the use of the brake on the centrifuge will be necessary to decelerate and stop the centrifuge. Rapid removal of the container from the centrifuge and disassembly of said container are also critical.

It is of the utmost importance to prevent these splashes of the filtrate from reaching the strainer and rewetting and recontaminating the crystals. Therefore, it is mandatory to use a splash guard which will prevent splashes of the filtrate from reaching the crystals by striking the underside of the strainer directly and/or by hitting the walls below the strainer and caroming up and/or creeping to and through or around the strainer.

The containers provided by the present invention can be used in any of the conventional cup-type centrifuges. They are particularly effective in a centrifuge having open cylindrical cups arranged to swing into a plane substantially parallel to the line of centrifugal force.

Other improvements and advantages of the invention will be apparent to those skilled in the art from the following illustrations. However, many modifications in materials and techniques are within the scope of the invention, hence the invention is not to be construed as being limited to the particular embodiments depicted in the illustrations and examples.

For illustration the instant invention will be described for use in the purification of a chemical compound. The container can then serve as the vessel in which to (1) dissolve the compound, (2) crystallize it. (3) centrifugally filter it.

Figures 1, 2:
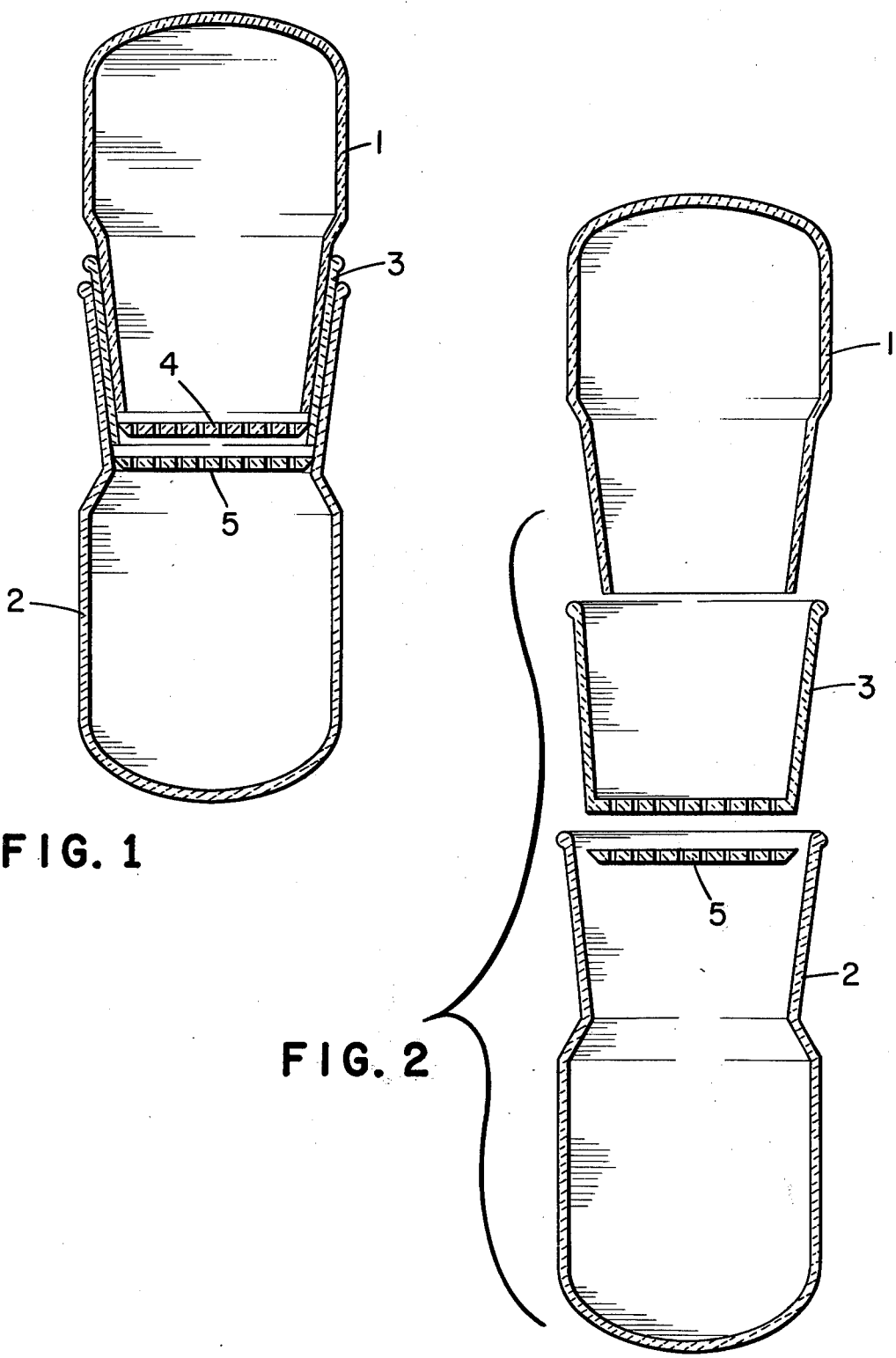
FIG. 1 is a cross-sectional view of one embodiment of the invention wherein the strainer is a separate part from the bushing and lodges against the bottom edge of the bushing, and the splash guard is located below the strainer and lodges against the ground joint of the female receiving segment.
FIG. 2 is an exploded view showing the embodiment of the invention wherein the strainer is made part of the bushing.

In one embodiment of the invention illustrated in FIG. 1 the crystallization chamber, segment 1, and the receiver, segment 2, are connected by means of standard tapered ground joints through standard tapered bushing or adapter 3, i.e., through a bushing or adapter which is ground with a standard taper on both the inside and outside surfaces. Strainer 4 and splash guard 5 are perforated porcelain disks with beveled edges.

Referring to FIG. 1, the compound to be purified and the appropriate amount of the solvent are heated in segment 1 until solution is complete. Any solid that may form on the walls of the container at the solution surface because of solvent evaporation is washed down and dissolved by the addition of a small amount of solvent down the side of the container. Strainer 4, bushing 3, and splash guard 5 are then placed upon the top of segment 1 and any change in concentration due to evaporation is prevented by placing segment 2 on bushing 3, thus making the system air-tight. If necessary a flat disk of filter paper is placed between segment 1 and strainer 4.

The whole system is then cooled very slowly and brought to equilibrium at the appropriate temperature, i.e., the temperature which will give the desired proportion of crystals and mother liquor. The assembly is then inverted, thermally lagged with insulating material if desired, placed in a properly counterbalanced centrifuge cup and quickly subjected to centrifugation. The mother liquor is thus efficiently removed from the crystals at the specified equilibrium temperature before any appreciable temperature change can take place. The crystals are retained within segment 1 by strainer 4 and the mother liquor is collected in segment 2. The container is then carefully lifted from the centrifuge and allowed to come to equilibrium at room temperature.

Disassembly can be accomplished without spilling the crystals and with no exposure to the atmosphere by first replacing segment 2, containing the filtrate, with a clean segment 2 (or with an appropriate stopper) in a controlled atmosphere and then turning the assembly right side up.

As will be obvious to those skilled in the art, numerous other methods for attaching strainer 4 to segment 1 can suitably be used so that the crystals will be retained within segment 1 when segment 2 is detached. For example, in another embodiment of the invention, illustrated in FIG. 2, the strainer is made part of the bushing segment and is a perforated glass or porcelain disk or a sintered glass disk sealed into the narrow end of the standard tapered bushing 3 as shown in FIG. 2.

Figure 3:
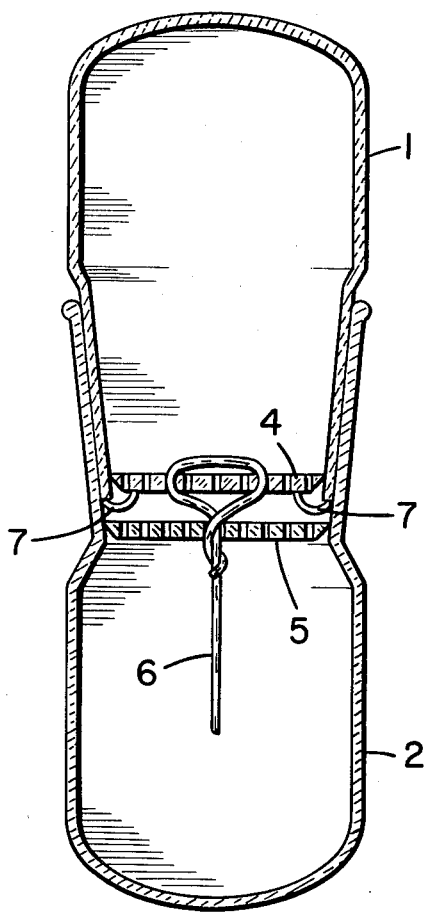
FIG. 3 is an embodiment of the invention wherein there is no extra bushing segment and the strainer is held in place by spring hooks, and is provided with a non-corrosive wire handle.
Figure 4:
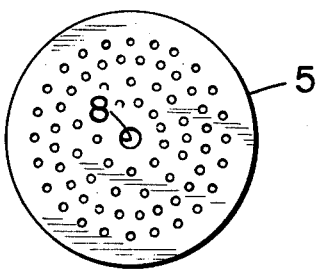
FIG. 4 is a top view of the splash shield showing the hole for the non-corrosive wire handle of the embodiment shown in FIG. 3.
Figure 5:
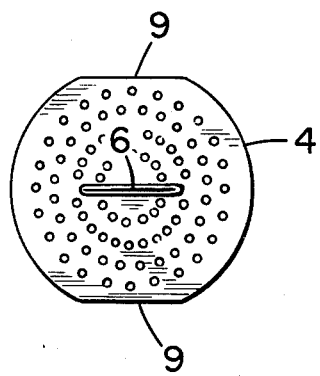
FIG. 5 is a top view of the strainer as shown in the embodiment of FIG. 3 showing the wire handle as attached and the flat edges.
Figure 6:
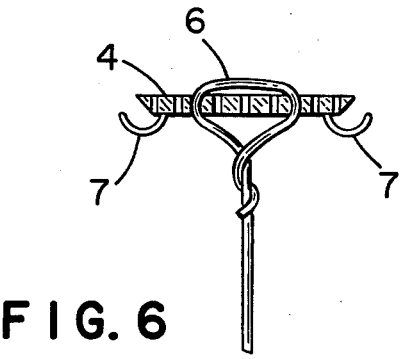
FIG. 6 is a side view of the strainer of FIG. 3 showing the attachment of the wire handle to the strainer, and the spring hooks.

In a third embodiment of the invention, illustrated in FIGS. 3 to 6, the ground joint of segment 1 is a standard tapered adapter ground on both surfaces inside and out. Strainer 4 is made from a circular perforated porcelain disk with beveled edges and having a diameter a few tenths of a millimeter greater than the internal diameter of the open end of segment 1. The top circumference of the strainer 4 is circular except for two parallel flat sides 9, FIG. 5, spaced a few tenths of a millimeter closer together than the inside diameter of the small end of the male joint of segment 1, so that strainer 4 can be inserted sideways into segment 1. Strainer 4 is provided with a stiff non-corrosive wire handle 6 for the purpose of manipulation and with spring hooks 7, FIG. 6. Strainer 4 can therefore be attached to segment 1 by bringing spring hooks 7 into engagement over the rims of the open end of segment 1 as shown in FIGS. 3 and 6. Splash shield 5 is a perforated porcelain disk with beveled edges and is provided with a hole 8, FIG. 4, through which handle 6 can pass.

An assembled apparatus incorporating the elements of the third embodiment is as follows:

a. a male glass segment comprising an enclosed rounded end extending into flat sides and then extending into tapered sides with an open end, said tapered sides tapered inwardly and ground on the outside surface thus forming substantially a ground tapered joint;

b. a female glass segment comprising an enclosed rounded end extending into tapered sides and an open end, said tapered sides tapered outwardly and ground on the inside surface thus forming substantially a ground tapered joint;

c. said male segment assembled to the female segment with said outer ground glass surface of said male segment directly in contact with the said inner ground glass surface of the said female segment thus substantially forming a leak-tight sealing surface, and d. a porcelain disk strainer or filter segment having a beveled edge, constructed with a top circular circumference equivalent to the inside circumference of the tapered male segment except for two parallel flat sides which are spaced a few tenths of a millimeter close together than the inside diameter of the small end of the male joint so that the strainer can be inserted sideways into the male segment and said strainer or filter segment positioned athwart the inner diameter of the tapered male segment said strainer's circumferential edge forming a tight fit seal with said inner ground glass surface of said male segment and said strainer or filter affixed to the male segment by means of hooks;

e. a thin round porcelain disk with a beveled edge thus substantially forming a splash shield said splash shield positioned just below the strainer or filter disk athwart the female segment of the assembled apparatus with the outer circumference of the splash shield in direct contact with the inner surface of the female tapered segment thereby imparting structural rigidity to the splash shield, said splash shield having a hole through the center thereof;

f. a wire handle located through the hole in the center of the splash shield affixed to the said porcelain strainer.

The improved containers of the instant invention can be used for the purification of liquid as well as solid compounds by solvent crystallization. The procedure is the same as for solid compounds but since the crystals melt below room temperature and centrifugation is at room temperature, the time interval between starting the centrifuge and collecting the sample must be as short as possible. Thermal lagging should be used around the container in the centrifuge cup and the disassembly must take place immediately after removal from the centrifuge. The pure products can be collected without exposure to the atmosphere by removing segment 2, containing the filtrate, and the splash guard 5 in an inert atmosphere and quickly substituting a clean segment 2 in which the pure liquid product can be collected by centrifuging at room temperature.

Another important feature of these containers is that the whole purification procedure can be carried out in an inert atmosphere; i.e., by preforming all transfers of materials, the preparation of the solution, the disassembly, and the collection of the pure crystals in a dry nitrogen atmosphere.

The containers provided by the present invention are particularly useful in: (1) the purification of both solid and liquid compounds by solvent recrystallization, particularly advantageous when the volume of mother liquor is small compared to the volume of the crystals, (2) the separation of crystals of one of the components from a binary or ternary mixture without the use of a solvent, (3) direct separation of crystals from a crude reaction mixture which dissolve when a solvent is used, (4) the rapid construction of binary system freezing point diagrams of fair accuracy (5) the determination of eutectic temperatures and compositions, (6) in plant control work in which, for example, it is desired to carry a reaction to a stage where a certain consistency or freezing point is reached and where instead of a rough determination of the freezing point, a determination of the amount of solid separated at some arbitrary temperature could readily be made with suitable accuracy. These uses have been demonstrated, evaluated, and discussed in the following references:

1. E. L. Skau and J. C. Arthur, Jr., "Melting and Freezing Temperature" in Physical Methods of Chemistry, A. Weissberger and B. W. Rossiter, Eds. (Technique of Chemistry, Vol. 1), Wiley-Interscience, New York, Part V, 1970, pp. 180–182, 168.
2. E. L. Skau and L. F. Rowe, Industrial and Engineering Chemistry, Analytical Edition, Vol. 3, pp, 147–148, Apr. 15, 1931.
3. E. L. Skau and W. Bergmann, Journal of Organic Chemistry, Vol. 3, pp. 166–174, 1938.

Having thus described my invention, I claim:

1. An apparatus for purifying chemical compounds by recrystallization comprising in combination:
   a. a male glass segment comprising an enclosed rounded end extending into flat sides and then extending into tapered sides with an open end, said tapered sides tapered inwardly and ground on the outside surface thus forming substantially a ground tapered joint;
   b. a female glass segment comprising an enclosed rounded end extending into tapered sides and an open end, said tapered sides tapered outwardly and ground on the inside surface thus forming substantially a ground tapered joint;
   c. said male segment assembled to the female segment with said outer ground glass surface of said male segment directly in contact with the said inner ground glass surface of the said female segment thus substantially forming a leak-tight sealing surface, and
   d. a porcelain disk strainer or filter segment having a beveled edge constructed with a top circular circumference equivalent to the inside circumference of the tapered male segment except for two parallel flat sides which are spaced a few tenths of a millimeter closer together than the inside diameter of the small end of the male joint so that the strainer can be inserted sideways into the male segment and said strainer or filter segment positioned athwart the inner diameter of the tapered male segment said strainer's circumferential edge forming a tight fit seal with said inner ground glass surface of said male segment and said strainer or filter affixed to the male segment by means of hooks;
   e. a thin round porcelain disk with a beveled edge thus substantially forming a splash shield said splash positioned just below the strainer or filter disk athwart the female segment of the assembled apparatus with the outer circumference of the splash shield in direct contact with the inner surface of the female tapered segment thereby imparting structural rigidity to the splash shield, said splash shield having a hole through the center thereof;
   f. a wire handle located through the hole in the center of the splash shield and affixed to the said porcelain strainer.
2. The apparatus as defined in claim 1 wherein the wire handle is a non-corrosive wire material.
3. The apparatus as defined in claim 1 wherein the hooks affixing the porcelain strainer to the male segment are non-corrosive wires.

* * * * *